United States Patent [19]
Mizrahi

[11] Patent Number: 5,730,334
[45] Date of Patent: Mar. 24, 1998

[54] CONTROLLED RELEASE BOTTLE CLOSURE

[76] Inventor: Gili Mizrahi, 5050 Coldwater Cyn #201, Sherman Oaks, Calif. 91423

[21] Appl. No.: 716,819

[22] Filed: Sep. 10, 1996

[51] Int. Cl.⁶ ........................................... B67D 5/06
[52] U.S. Cl. .................... 222/185.1; 222/556; 141/364
[58] Field of Search .................... 222/185.1, 509, 222/556; 141/364, 375

[56] References Cited

U.S. PATENT DOCUMENTS

| | | | |
|---|---|---|---|
| 2,786,613 | 3/1957 | Morrison | 222/185.1 |
| 4,953,729 | 9/1990 | Kloosterhouse | 141/364 |
| 5,326,001 | 7/1994 | Holmquist et al. | 222/556 |

FOREIGN PATENT DOCUMENTS 526460  8/1956  Belgium ........................ 222/185.1

*Primary Examiner*—Philippe Derakshani

[57] ABSTRACT

A reusable, controlled release bottle closure for use with standard water bottles of the type associated with standard water cooler devices. The closure or cap is comprised of three main elements those being a molded plastic cap, an internal resilient gasket and a pull strap. The top surface of the cap has a circumfrential slot radiating ninety percent about a center point in the cap. The remaining ten percent area which is not a slot acts as an integral hinge so that the flat surface area within the slot can act as a flap. The resilient gasket lies directly under the top cap area and covers the circumfrential slot. The pull strap is attached to the flap so that when pulled, the flap and attached gasket are lifted up. When the cap assembly of the present invention is in place on a standard water bottle, the bottle may be turned upside down with out water spilling out. When the water bottle is in place on top of a standard water cooler, the pull strap may be used to release the water in a controlled fashion so as not to cause unwanted spilling of water in the area surrounding the water cooler.

5 Claims, 4 Drawing Sheets

5,730,334

CONTROLLED RELEASE BOTTLE CLOSURE

BACKGROUND OF THE INVENTION

The present invention relates to reusable bottle closures and more specifically to a controlled release bottle closure device for a standard water bottle used in conjunction with a standard water dispensing device commonly known as a water cooler.

Water coolers are currently found in millions of homes and offices. Typically, water is delivered in 5 gallon containers by a water processing company. These containers are quite heavy, about 50 pounds, and quite large. The user must remove the plastic bottle cap, lift the bottle to chest height and then turn the bottle upside down while quickly inserting the neck of the bottle into the top receiving portion of the water cooler. This is a rather difficult and awkward process even for a strong individual and frequently results in the unintended spilling of water in areas in close proximity to the water cooler.

Attempts to improve the process of inserting the water bottle into the water cooler so that no accidental spilling occurs have been described in prior art but they generally involve the need to make costly design modifications in the water cooler as well as the water bottle closure. No manufacturer has elected to do this to the best of my knowledge.

OBJECT AND SUMMARY OF THE PRESENT INVENTION

It is an object of the present invention to provide a controlled release bottle cap for a standard water bottle used in conjunction with water coolers which enables the user to insert the neck of the water bottle into the top of a water cooler in a leisurely fashion without worrying about accidentally spilling water onto surrounding surfaces. It is a further object of the present invention to provide a controlled release bottle cap for standard water cooler type water bottles which is reusable. It is a further object of the present invention to provide a controlled release bottle cap for standard water cooler type bottles which is easy and economical to manufacture. It is a further object of the present invention to provide a controlled release bottle cap which works independently of the water cooler and does not require any modifications to existing standard water cooler devices for the controlled release action to work.

The above objects are accomplished by providing a molded plastic cap which snaps onto a standard water bottle in a similar fashion to existing water bottle caps however, the present invention has a flap molded into the top portion of the cap and a resilient flat gasket is adhered to the underside of the flap. A pull strap is adhered to the far end of the flap. The pull strap trapped between the shoulder of the water bottle and the top lip of the water cooler receptacle and is long enough to be protrude beyond the outside perimeter of the water bottle and associated water cooler dispenser. When a user turns a water bottle and the attached present invention upside down in the process of refilling a water cooler, the contents of the bottle do not spill out until the user pulls on the affore mentioned strap causing the flap to open and the water to exit the bottle and enter the water cooler in the normal fashion. When the water is completely drained from the bottle the user can remove the cap of the present invention and reset the flap and resilient gasket to its original position and then reuse the cap of the present invention on another water bottle and repeat the process described above.

GENERAL DESCRIPTION OF THE DRAWINGS

DETAILED DESCRIPTION OF THE DRAWINGS

Figure 1:
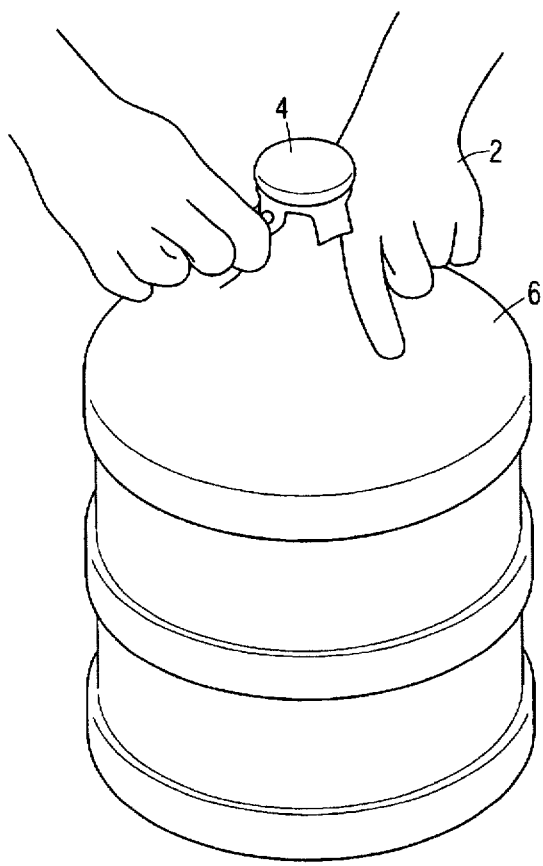
FIG. 1 is a perceptive view of a person removing a standard cap from a standard five gallon water cooler type water bottle.
Figure 2:
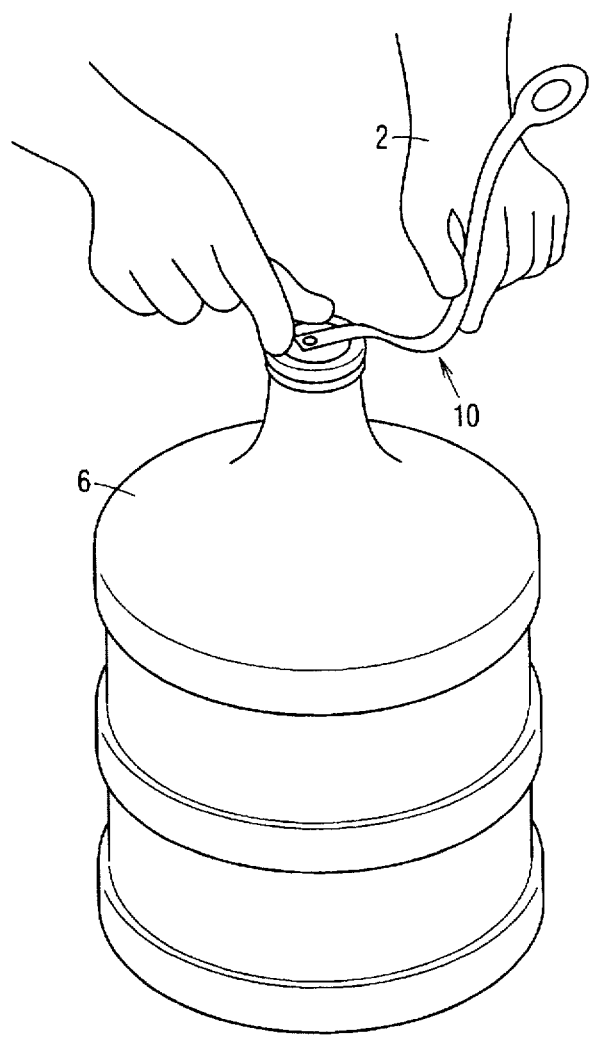
FIG. 2 is a perspective view of a person attaching the water bottle cap of the present invention

Referring now to FIG. 1, a person 2 removes the standard cap 4 from a standard five gallon water bottle 6 and snaps on the bottle cap of the present invention as shown in FIG. 2.

Figure 3:
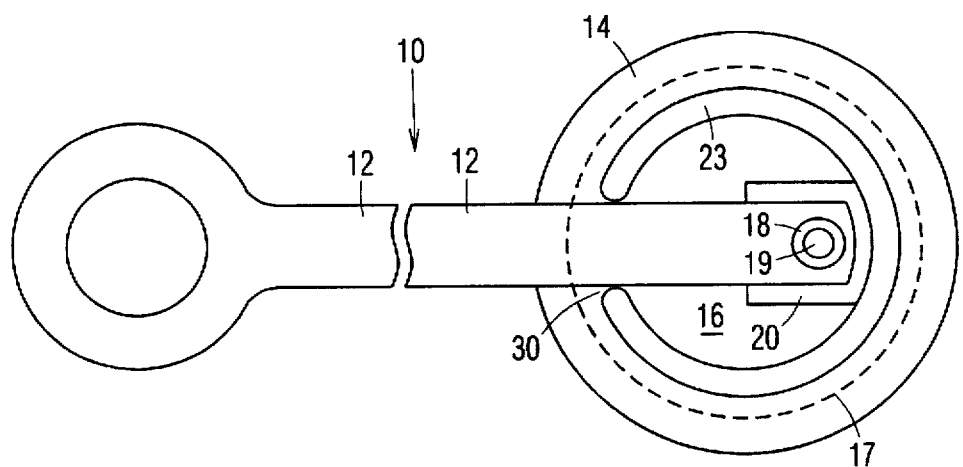
FIG. 3 is a top view of the water bottle cap assembly of the present invention.

FIG. 3 shows a top view of the bottle cap of the present invention 10 wherein a circumfrential slot 23 in the flat, top area of the cap 14 cuts through the flat top area in all except one point 30. The cap assembly 10 of the present invention is made of molded polypropylene or polyethylene and is resilient enough so that area 30 can act as an integral hinge member. Flat area 16 can fold outwardly 25 when a user pulls on strap 12 which is affixed to flap 16 at post 19 by means of retaining washer 18. "C" shaped wall 20 acts as a retaining wall to insure that strap 12 remains in the ideal pulling position as shown. Rubber gasket 17 is indicated by a dotted line and is in held place immediately under flap 16 by means of a retaining washer 40 which is pushed onto post 21.

Figure 4:
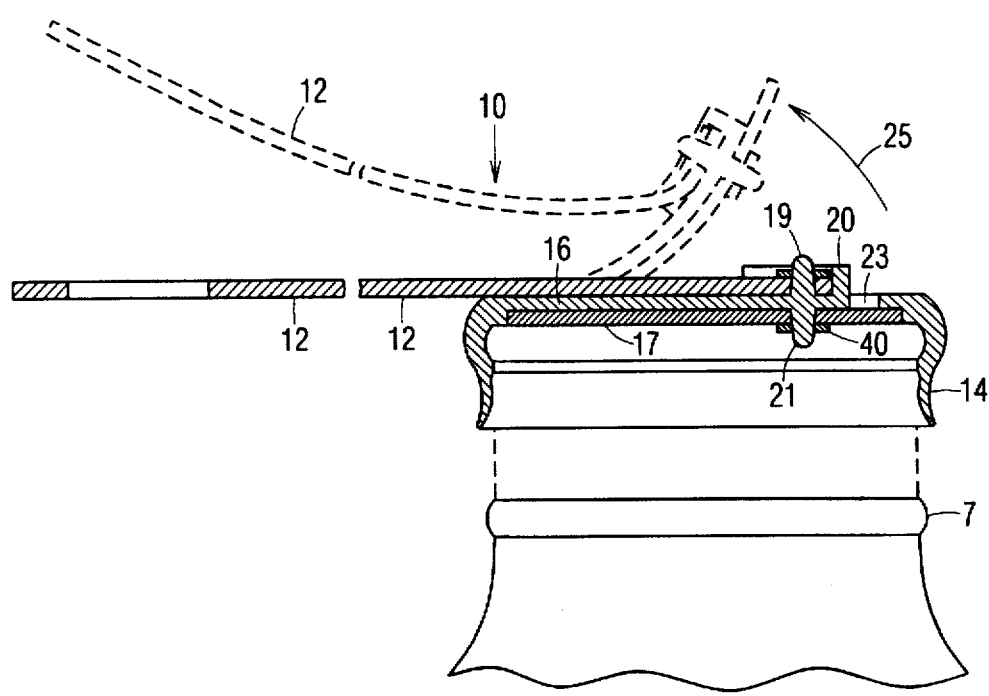
FIG. 4 is a side section view of the water bottle cap assembly of the present invention.
Figure 7:
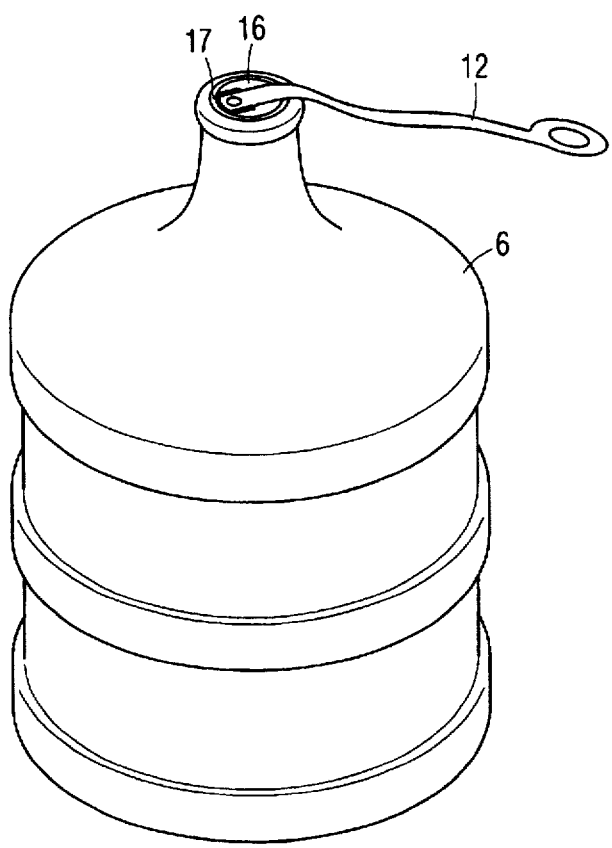
FIG. 7 is a perspective view of the water bottle cap of the present invention before installation into a water cooler.
Figure 8:
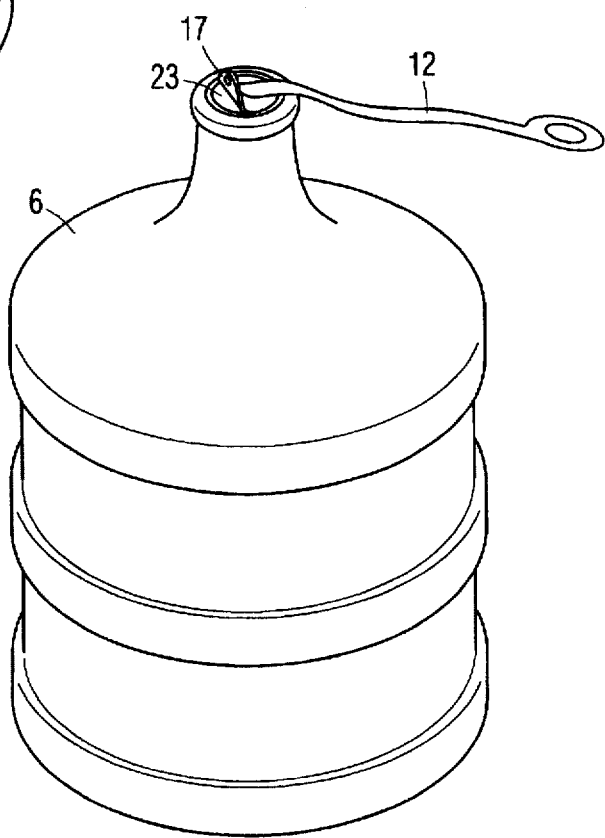
FIG. 8 is a perspective view of the water bottle cap of the present invention after it has been removed from use in a water cooler.

FIG. 4 shows a side section view of the present invention wherein main cap 14 is ready to attach to a standard water bottle top 7. Rubber gasket 17 is shown directly under flap 16. Gasket 17 serves two purposes. One is to act as a water tight seal between the inside perimeter of cap 14 and water bottle lip 7, and the other is to act as a temporary seal for circumfrential slot 23. Gasket 17 is flexible enough so that when strap 12 is pulled, the outer perimeter of the gasket 17 is able to deform and be forced through slot 23. The cap assembly 10 of the present invention is clearly shown in the ready to use position in FIG. 7 and in the pulled, after use position in FIG. 8 where gasket 17 is pulled through slot 23. Gasket 17 can be returned to its original location allowing repeated reuse of the cap assembly 10 of the present invention.

Figures 5, 6:
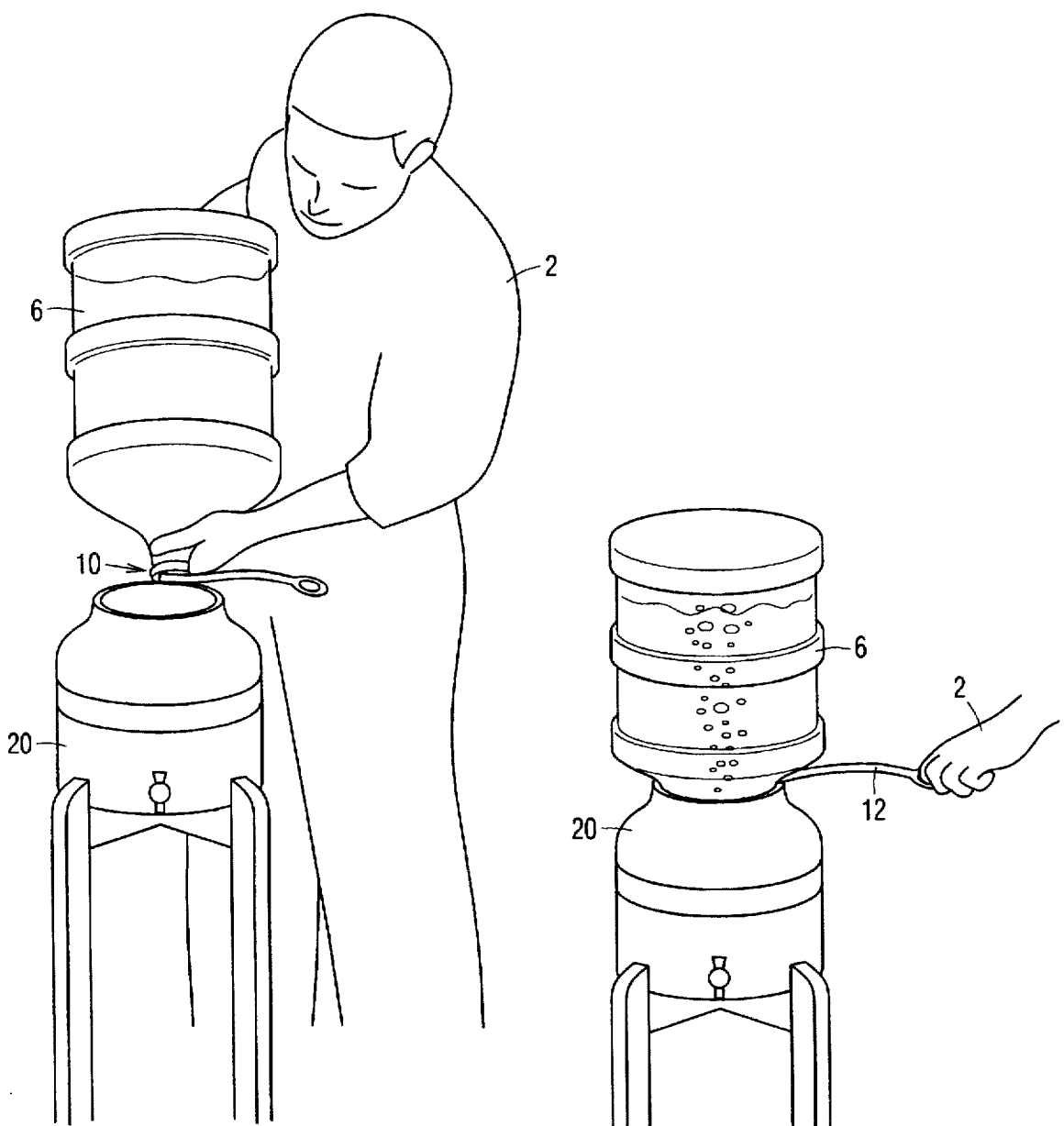
FIG. 5 is a perspective view of a person in the process of installing a five gallon water bottle into a standard water cooler device.
FIG. 6 is a perspective view of a person pulling the release strap of the bottle cap of the present invention.

FIG. 5 shows a user 2 in the process of installing a five gallon water bottle 6 with the cap assembly 10 of the present invention in place. Note that no water is escaping at this point meaning that the user 2 can leisurely place the water bottle in its proper resting place above a standard water cooler 20 without fear of spilling water in unwanted locations. FIG. 6 shows the user 2 pulling the release strap 12 to allow a controlled release of water from the water bottle 6 to the water cooler assembly 20.

The entire cap assembly 10 is made of inexpensive injection molded plastic and is therefore inexpensive to manufacture.

While the present invention has been described in connection with a particular embodiment thereof, it will be understood by those skilled in the art that many changes and modifications can be made without departing from the true spirit and scope of the present invention. Therefore, it is intended by the appended claims to cover all such changes and modifications which come within the true spirit and scope of this invention.

What is claimed:

1. A controlled release bottle closure for standard water bottles associated with standard water coolers wherein said closure is composed of three elements, those being a main bottle cap having a circular top and adjoining side wails, said cap having a ninety percent circumfrential slot radiating about a central point located on the top flat surface of said cap so that the remaining ten percent where said slot is not in effect acts as an integral hinge member and causes the top flat surface of said cap which lies within said circumfrential slot to act as a flap, a resilient gasket located directly under the inside top surface of said main cap, said gasket being larger in diameter than the outer circumference of said slot, said gasket being permanently attached to the underside of said cap top by means of a post emanating from the underside of said cap top and a retaining washer located on the opposite side of said gasket and a pull strap permanently attached to a post emanating from the top surface of said cap flap.

2. A controlled release bottle closure of claim 1 wherein said strap is held in the optimal pulling orientation by means of an integral "C" shaped wall protruding from the top surface of said flap.

3. A controlled release bottle closure of claim 1 wherein said strap is made of die cut polyethylene plastic.

4. A controlled release bottle closure of claim 1 wherein all parts are easily and economically manufactured.

5. A controlled release bottle closure of claim 1 wherein said bottle closure is reusable.

* * * * *